J. OLSON.
DISK-HARROW.
APPLICATION FILED SEPT. 16, 1911.
1,060,280.
Patented Apr. 29, 1913.
2 SHEETS—SHEET 1.
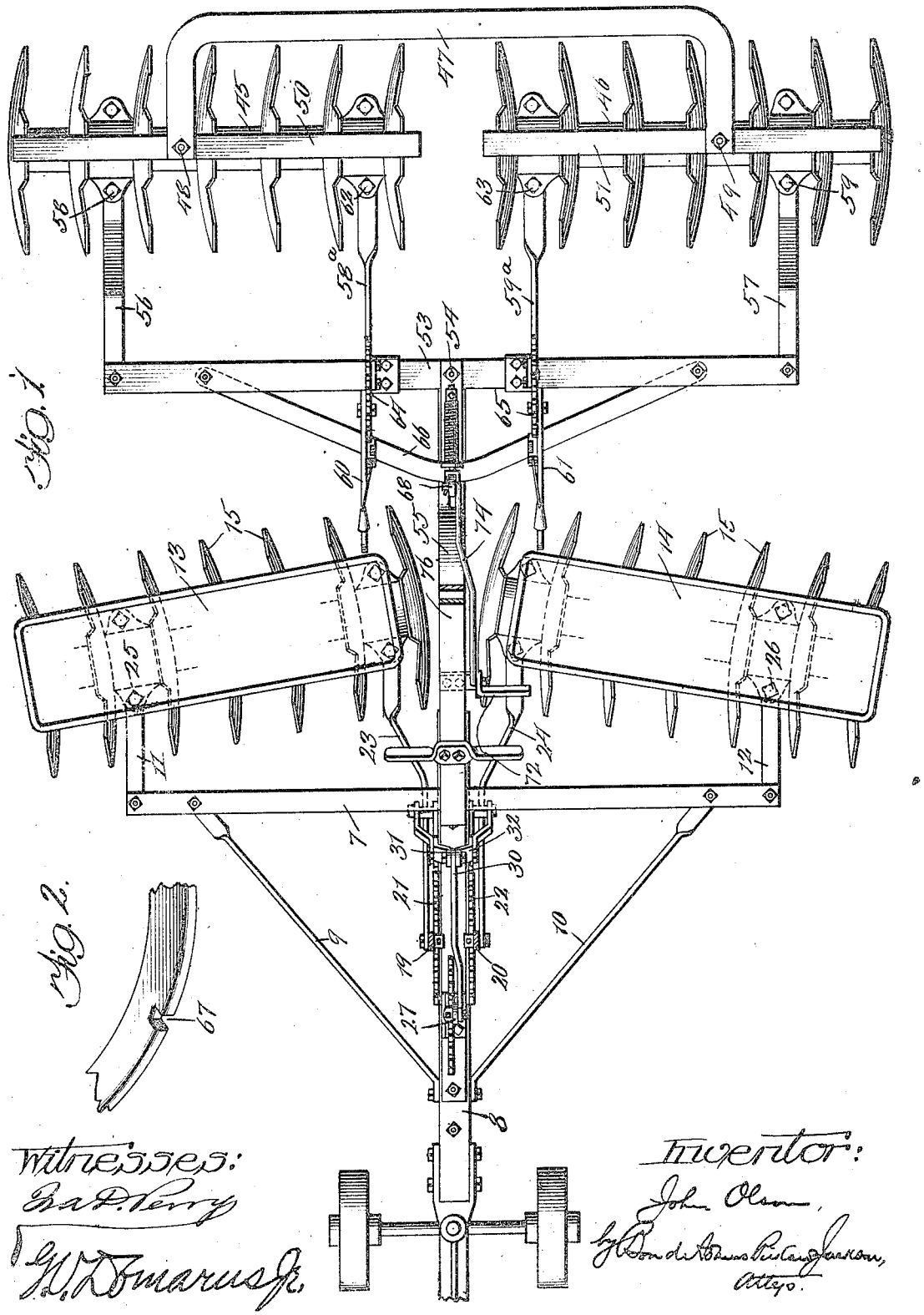

J. OLSON.
DISK HARROW.
APPLICATION FILED SEPT. 16, 1911.
1,060,280.
Patented Apr. 29, 1913.
2 SHEETS—SHEET 2.
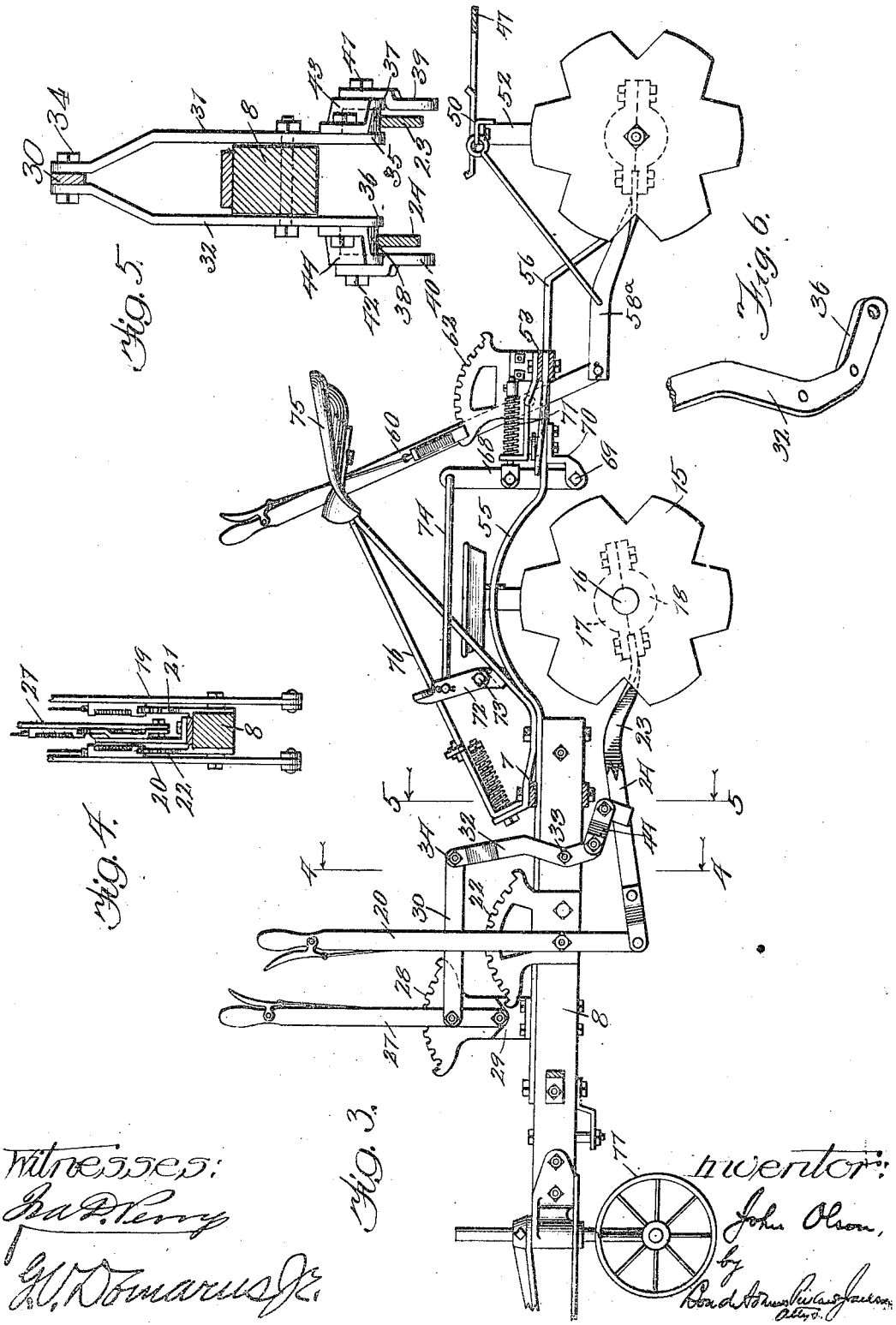

UNITED STATES PATENT OFFICE.

JOHN OLSON, OF BRADLEY, ILLINOIS, ASSIGNOR TO SEARS, ROEBUCK AND COMPANY, OF CHICAGO, ILLINOIS, A CORPORATION OF NEW YORK.

DISK HARROW 1,060,280.

Specification of Letters Patent.    Patented Apr. 29, 1913.

Application filed September 16, 1911. Serial No. 649,602.

*To all whom it may concern:*

Be it known that I, JOHN OLSON, a citizen of the United States, residing at Bradley, in the county of Kankakee and State of Illinois, have invented certain new and useful Improvements in Disk Harrows, of which the following is a specification, reference being had to the accompanying drawings:

My invention relates to agricultural implements, and has particularly to do with disk harrows.

It has for its object to provide an improved double disk harrow—that is to say, a harrow comprising front and rear frames arranged tandem, each frame having two sets of disks or gangs arranged on shafts extending transversely of the machine.

My improvements relate to the construction of the frames and the manner of connecting them together and the mechanism for controlling the angular position of the several disk gangs; also to mechanism for applying downward pressure to the inner ends of the sets of disk gangs connected with one of the frames.

In the accompanying drawings,—Figure 1 is a plan view of my improved harrow, the seat-support being removed and some of the levers being shown in section; Fig. 2 is a perspective view of part of one of the members by which the rear frame is locked in position; Fig. 3 is substantially a longitudinal vertical section of my improved harrow; Fig. 4 is a vertical cross-section on line 4—4 of Fig. 3; Fig. 5 is a vertical cross-section on line 5—5 of Fig. 3; and Fig. 6 is a perspective view of the lower part of the lever by which the downward pressure on the inner ends of the front disk shafts is regulated.

As best shown in Fig. 1, the front frame of my improved harrow comprises a transverse bar 7 fixedly secured to a tongue 8 and braced by braces 9—10. The outer ends of said transverse bar 7 are connected by straps 11—12 with the outer portions of a pair of disk gangs 13—14 of any suitable construction. I prefer, however, to construct the several gangs by mounting a series of disks 15 upon a shaft 16, spacing them apart in any suitable way. The straps 11—12 are best secured to the gangs by means of clips 17—18, as shown in Fig. 3, but any other suitable arrangement may be employed.

19—20 indicate levers for changing the angular position of the front gangs, said levers being mounted at the rear end of the tongue, as shown in Figs. 1 and 3, and being provided with the usual locking segments 21—22. The levers 19—20 are connected by straps 23—24 with the inner end portions of the gangs, as shown in Figs. 1 and 3, so that by operating said levers the inner ends of the front gangs are moved forward or backward to swing the gangs about pivots 25—26 which connect their outer end portions with the straps 11—12.

For the purpose of pressing down upon the inner end portions of the front gangs to cause them to penetrate the soil more deeply, I provide a lever 27, which is also mounted on the tongue, preferably in advance of the levers 19—20, as shown in Fig. 3, and is provided with a locking segment 28. Preferably instead of mounting the lever 27 directly upon the tongue, it is mounted upon a standard 29 which carries the segment 28, as shown in Fig. 3. The lever 27 is connected by a connecting bar 30 with bent levers 31—32 arranged at opposite sides of the tongue and fulcrumed at 33 thereupon, as shown in Figs. 1, 3 and 5. The levers 31—32 are connected together and to the strap 30 by a bolt 34 so that they operate in unison. The lower ends of said levers are bent or shaped to form arms 35—36 which extend rearwardly above the straps 23—24, as shown in Figs. 3 and 5. 37—38 indicate rollers carried by the arms 35—36, respectively, and overlying the straps 23—24, as shown in Fig. 5. 39—40 indicate guideplates, which project downward outside of and adjacent to the straps 23—24 for the purpose of holding the rollers 37—38 properly in position. Said plates are carried by bolts 41—42, which also form pivots for the rollers 37—38. 43—44 indicate bracing straps, which are connected with the levers 31—32 and with the bolts 41—42, as shown in Figs. 4 and 5, for bracing the several parts. By this construction the operator, by drawing back the lever 27, may rock the levers 31—32 to cause the rollers 37—38 to bear down upon the straps 23—24, thereby pressing down upon the inner ends of the front gangs and causing the disks to enter the soil more deeply.

45—46 indicate the rear gangs, which comprise a number of disks arranged opposite to those of the front gangs.

47 indicates a U-shaped bar, which connects the two rear gangs together, said bar being pivotally connected with said gangs by pivots 48—49 which pass through horizontal bars 50—51 connected with the gangs by standards 52, or any other suitable means.

53 indicates a transverse bar or frame, which is centrally pivoted by a pivot 54 to the rear end of a draft-bar 55 which is fixedly secured at its front end to the tongue 8 and extends rearwardly between the front gangs and the point of its attachment to the bar 53. The ends of the bar 53 are connected by straps 56—57 and pivots 58—59 with the outer portions of the rear gangs, as shown in Fig. 1. The inner portions of the rear gangs are connected by straps 58ª—59ª and levers 60—61 with intermediate portions of the bar 53, the straps 58ª—59ª being connected with the gangs by pivots 62—63 so that by operating said levers the angular position of the rear gangs may be adjusted. The levers 60—61 are provided with locking segments 64—65, as shown in Figs. 1 and 3.

The bar 53 may either be locked in a position perpendicular to the draft-bar 55 or may be left free so that the rear gangs will trail behind the front gangs. This is accomplished by providing the bar 53 with a curved strap 66, the ends of which are connected with the outer portions of the bar 53 so that the strap 66 extends forward of said bar, as shown in Fig. 1. The bar 66 is provided at its center with a notch 67, as shown in Fig. 2, said notch being adapted to receive a latch-bar 68 pivoted at 69 upon a bracket 70 secured to the under side of the draft-bar 55, as shown in Fig. 3. A spring 71 serves to draw back normally upon the latch-bar 68 and hold it in the notch 67. The latch-bar 68 is operated to move it out of the notch 67 by a lever 72 pivoted at 73 upon the draft-bar 55 and connected by a rod 74 with the latch-bar 68, as shown in Fig. 3. By this construction when the notch 67 is in the position to receive it the latch-bar 68 will normally lie in said notch and hold the rear frame in fixed angular relation to the draft-bar 55. By pressing forward on the lever 72, however, the rear frame may be released, thereby permitting the rear gangs to follow naturally behind the front gangs—the angular position of the rear frame varying naturally. The angular position of the rear gangs may be varied with reference to the rear frame by operating the levers 60—61.

75 indicates the driver's seat, which is carried by a seat-support 76 mounted on the rear portion of the tongue so that the driver may have the several levers conveniently accessible.

77 indicates caster-wheels, which support the rear portion of the tongue, as shown in Figs. 1 and 3.

While I have described with considerable particularity the embodiment of my invention shown in the accompanying drawings, I wish it to be understood that my invention is not restricted to the details of the construction shown except in so far as they are particularly claimed, but includes generically the subject-matter of the broader claims.

That which I claim as my invention, and desire to secure by Letters Patent, is,—

1. A disk-harrow, comprising front and rear frames, disk gangs connected with said frames, means pivotally connecting said front and rear frames together substantially in the longitudinal axis of the machine, and means for locking said frames in fixed angular relation with each other.

2. A disk-harrow, comprising front and rear frames, disk gangs connected with said frames, a draft-bar rigidly connected with the front frame centrally thereof and projecting rearwardly therefrom, said rear frame being pivotally connected substantially at its center with said draft-bar, and means for locking said rear frame in fixed relation to said draft-bar.

3. A disk-harrow, comprising front and rear frames, disk gangs connected with said frames, means pivotally connecting said front and rear frames together substantially in the longitudinal axis of the machine, means for locking said frames in fixed angular relation with each other, and means for varying the angular position of the disk gangs connected with the rear frames with reference to said frame.

4. A disk-harrow, comprising front and rear frames, a draft-bar fixedly connected to the front frame and substantially at the center thereof and pivotally connected at the rear with said rear frame, disk gangs connected with said front and rear frames, respectively, and means for locking the rear frame in fixed relation with said draft-bar.

5. A disk-harrow, comprising front and rear frames, a draft-bar fixedly connected with the front frame and pivotally connected at the rear with said rear frame, disk-gangs connected with said front and rear frames, respectively, means for varying the angular adjustment of the several gangs, and means for locking the rear frame in fixed angular relation with said draft-bar.

6. A disk-harrow, comprising front and rear frames, a draft-bar fixedly connected with the front frame and pivotally connected at the rear with said rear frame, disk-gangs connected with said front and rear frames, respectively, means for varying the angular adjustment of the several gangs, a latch for locking said rear frame in fixed relation with the draft-bar, and a lever for operating said latch.

7. In a double disk-harrow, the combination of front and rear frames comprising transverse-bars, a tongue fixedly connected with said front frame, a draft-bar fixedly connected with the tongue and pivotally connected at the rear with said rear frame, front and rear disk-gangs, means connecting the outer portions of said disk-gangs with said transverse bars, respectively, means connecting the inner portions of said gangs with the front and rear frames, respectively, comprising levers for varying the angular position of said gangs, and a U-shaped bar pivotally connecting the rear gangs together.

JOHN OLSON.

Witnesses:
W. R. BOND,
F. L. MARTIN.

Copies of this patent may be obtained for five cents each, by addressing the "Commissioner of Patents, Washington, D. C."